United States Patent
Lee et al.

(10) Patent No.: US 8,135,278 B2
(45) Date of Patent: Mar. 13, 2012

(54) BIDIRECTIONAL WAVELENGTH-DIVISION-MULTIPLEXED PASSIVE OPTICAL NETWORK

(75) Inventors: Kwan-Il Lee, Seoul (KR); Sang-Bae Lee, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 804 days.

(21) Appl. No.: 12/185,408

(22) Filed: Aug. 4, 2008

(65) Prior Publication Data
US 2009/0208212 A1   Aug. 20, 2009

(30) Foreign Application Priority Data
Feb. 19, 2008   (KR) .................. 10-2008-0014799

(51) Int. Cl.
H04J 14/00 (2006.01)
G02F 1/00 (2006.01)
H04B 17/00 (2006.01)
H04B 10/08 (2006.01)

(52) U.S. Cl. ............... 398/68; 398/5; 398/17; 398/34; 398/66

(58) Field of Classification Search ............ 398/66, 398/69, 70, 71, 72
See application file for complete search history.

(56) References Cited

U.S. PATENT DOCUMENTS

| | | | | |
|---|---|---|---|---|
| 7,415,205 B2* | 8/2008 | Shin et al. | | 398/5 |
| 2005/0147412 A1* | 7/2005 | Park et al. | | 398/72 |
| 2006/0104638 A1* | 5/2006 | Chung et al. | | 398/71 |
| 2006/0165412 A1* | 7/2006 | Jung et al. | | 398/71 |
| 2007/0206964 A1* | 9/2007 | Lee et al. | | 398/208 |

FOREIGN PATENT DOCUMENTS

| KR | 10-2005-0073380 | 7/2005 |
|---|---|---|
| KR | 10-2005-0090232 | 9/2005 |

* cited by examiner

*Primary Examiner* — Kenneth N Vanderpuye
*Assistant Examiner* — Abbash H Alagheband
(74) *Attorney, Agent, or Firm* — NSIP Law

(57) ABSTRACT

Provided is a bidirectional wavelength division multiplexed passive optical network (WDM-PON) which includes a central office (CO) that transmits and receives multiplexed optical signals, a remote node (RN) that communicates with the CO, receives a multiplexed optical signal to demultiplex, and receives a demultiplexed optical signal to multiplex, an optical network unit (ONU) that transmits and receives demultiplexed optical signals to and from the RN, operational and protective backbone optical fibers that connect the CO to the RN, and operational and protective distribution optical fibers that connect the RN to the ONU. The ONU transmits and receives optical signals through the operational distribution optical fiber and the operational backbone optical fiber, and, where a failure occurs in the operational distribution optical fiber or the operational backbone optical fiber, the ONU transmits and receives optical signals through the protective distribution optical fiber and the protective backbone optical fiber.

9 Claims, 5 Drawing Sheets

BIDIRECTIONAL WAVELENGTH-DIVISION-MULTIPLEXED PASSIVE OPTICAL NETWORK

CROSS-REFERENCE TO RELATED APPLICATION

This application claims the benefit under 35 U.S.C. §119 (a) of a Korean Patent Application No. 10-2008-0014799, filed on Feb. 19, 2008 in the Korean Intellectual Property Office, the entire disclosure of which is hereby incorporated by reference.

TECHNICAL FIELD

The following description relates to a bidirectional wavelength division multiplexed passive optical network (hereinafter, referred to as WDM-PON) which uses a wavelength-locked light source for spectrum-sliced incoherent light, and more specifically, to a WDM-PON in which an N×N arrayed waveguide grating (hereinafter, referred to as AWG) is provided in a remote node (RN) instead of a 1×N AWG, and a central office (CO), the RN, and a plurality of optical network units (ONU) are connected to operational and protective optical fibers such that the WDM-PON spontaneously detects a failure in backbone and distribution optical fibers so as to recover communication through an alternative optical fiber (protective optical fiber).

BACKGROUND

For effective provision of multimedia and broadcasting services, which are continuously increasing in volume, the development of passive optical network is being actively carried out. In particular, a WDM-PON technology believed to be developed in Korea exhibits excellent performance. Generally, equipments used therein were more expensive than those used in G/E PON (G-PON: gigabit passive optical network, E-PON: Ethernet passive optical network). Therefore, the technique has not been attracting attention in view of the less expensive competition. Recently, however, the cost has been considerably reduced with the development of gigabit technology, and the price per bandwidth may now be even cheaper than those of its competitors. Accordingly, the WDM-PON is attracting attention again.

In particular, as gigabit ONUs are provided, the transmission capacity of a WDM-PON has increased up to 2 gigabits in a case of 16 channels. A communication failure caused by disconnection of backbone network or distribution network optical fibers for connecting a CO to ONUs may cause a serious economic loss. Therefore, there is a need to develop a system which can survive even where a failure occurs in optical fibers.

FIG. 1 is a diagram showing the configuration of a conventional passive optical network which uses light sources having different wavelengths from each other. In the conventional passive optical network, a bypass optical fiber is added to recover communication where a failure occurs in an operational optical fiber. In the bidirectional WDM-PON system, a CO and an RN are connected through two operational and protective optical fibers 140 and 142 by using a 1×2 switch 130 and a 2×1 coupler 150. In this case, some of upstream signals between the switch and the operational optical fiber are extracted to monitor the upstream signals.

In a normal state, the CO sends a multiplexed optical signal through the operational optical fiber 140. Further, the RN receives the multiplexed optical signal from the operational optical fiber through the 2×1 coupler 150, and a 1×N AWG 160 demultiplexes the multiplexed optical signal to transmit to the respective ONUs through distribution optical fibers 161 and 163. Inversely, upstream optical signals output from the respective ONUs are transmitted to the RN, and are then multiplexed by the 1×N AWG 160 so as to be transmitted to the CO. Meanwhile, where a failure such as the disconnection of operational optical fiber occurs, an upstream signal optical fiber monitor 120 detects the failure and then switches the path of the 1×2 switch 130 into the protective optical fiber 142 to thereby recover communication.

In the conventional WDM-PON, a colorless ONU may not be utilized. Further, although the communication may be recovered where a failure occurs in the backbone network, it may not be recovered where a failure occurs in the distribution network. Recently, since ONUs operate at a gigabit rate and a large number of users are connected to one ONU, there is a need for a WDM-PON which may recover communication where a failure occurs in a distribution optical fiber.

SUMMARY

According to an aspect, there is provided a bidirectional WDM-PON comprising colorless ONUs, which spontaneously detects a failure in backbone and distribution optical fibers so as to recover communication.

According to another aspect, a bidirectional WDM-PON comprises a central office (CO) that transmits and receives multiplexed optical signals, a remote node (RN) that communicates with the CO, receives a multiplexed optical signal to demultiplex, and receives a demultiplexed optical signal to multiplex, an optical network unit (ONU) that transmits and receives demultiplexed optical signals to and from the RN, operational and protective backbone optical fibers that connect the CO to the RN, and operational and protective distribution optical fibers that connect the RN to the ONU. The ONU may transmit and receive optical signals through the operational distribution optical fiber and the operational backbone optical fiber, and where a failure occurs in the operational distribution optical fiber or the operational backbone optical fiber, the ONU may transmit and receive optical signals through the protective distribution optical fiber and the protective backbone optical fiber.

The CO may comprise an optical transceiver that transmits and receives optical signals, an arrayed waveguide grating (AWG) that wavelength-division multiplexes the optical signal transmitted from the optical transceiver and wavelength-division demultiplexes the optical signal received into the optical transceiver, an optical coupler that couples or separates the optical signal transmitted from the optical transceiver and the optical signal received into the optical transceiver to or from each other, and an incoherent light source that provides seed light for generating an optical signal to the optical transceiver and the ONU.

The optical coupler may be a 2×2 optical coupler.

The CO may further comprise a plurality of WDM couplers and an optical circulator.

The optical transceiver may receive the seed light from the incoherent light source and transmit an optical signal having the same wavelength as that of the seed light.

The optical transceiver may be a Fabry-Perot laser, of which the entire surface is subjected to antireflection coating, or a reflective semiconductor optical amplifier (RSOA).

The RN may comprise an N×N AWG where N represents a natural number.

Where the multiplexed optical signal is input to an N-th port of the N×N AWG, demultiplexed optical signals may be output from first to (N−1)th ports of the N×N AWG in the side opposite to the N-th port.

The ONU may receive seed light for generating an optical signal from the CO via the RN, and transmit an optical signal having the same wavelength as that of the received seed light.

The ONU may comprise an optical signal monitor that measures an intensity of an optical signal received from the RN through the operational distribution optical fiber, an optical switching element that is selectively connected to the operational distribution optical fiber or the protective distribution optical fiber, an optical transceiver that is connected to the optical switching element so as to transmit and receive optical signals, and a control unit that connects the optical switching element to the protective distribution optical fiber where a failure occurs in the optical signal measured by the optical signal monitor.

The optical transceiver may receive seed light for generating an optical signal from the CO via the RN, and transmit an optical signal having the same wavelength as that of the received seed light.

The optical transceiver may be a Fabry-Perot laser, of which the entire surface is subjected to antireflection coating, or an RSOA.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Hereinafter, a bidirectional wavelength division multiplexed passive optical network (WDM-PON) according to an exemplary embodiment will be described with reference to the accompanying drawings.

In the following descriptions, "upstream" means that data is directed from an ONU to a CO through a RN, and "downstream" means that data is directed from the CO to the ONU through the RN.

Figure 1:
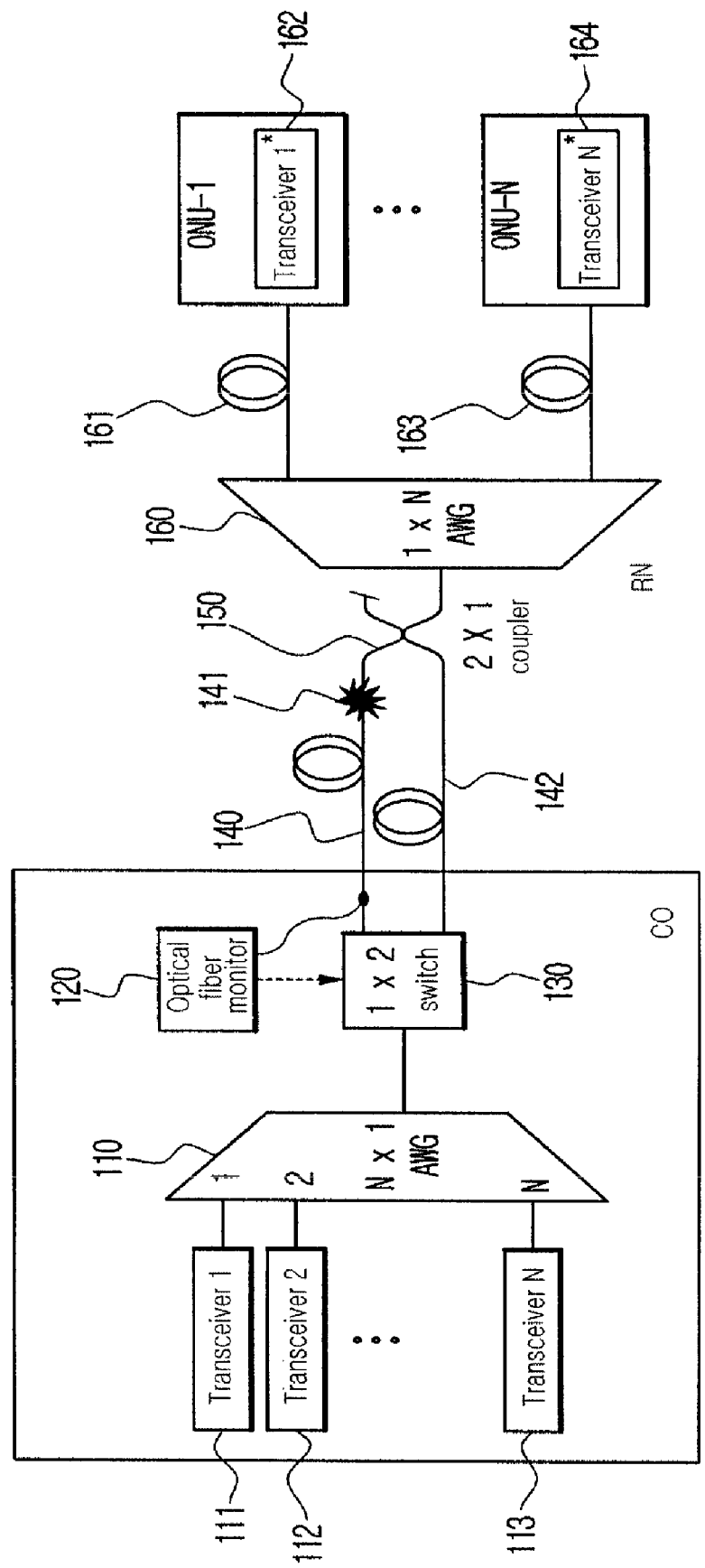
FIG. 1 is a diagram showing the configuration of a conventional bidirectional WDM-PON.
Figure 2:
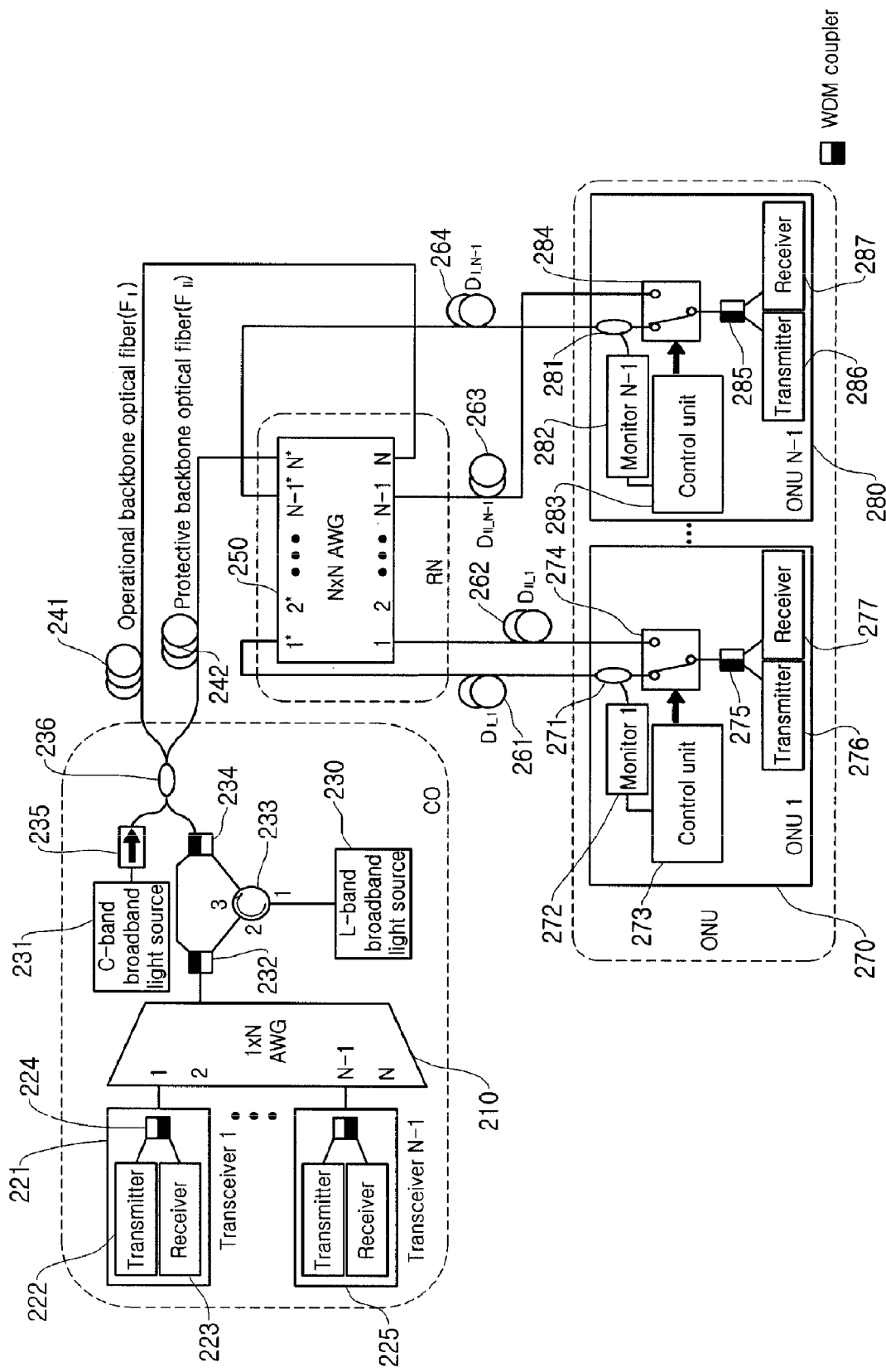
FIG. 2 is a diagram showing the configuration of a bidirectional WDM-PON according to an exemplary embodiment.

FIG. 2 illustrates a WDM-PON according to an exemplary embodiment.

Referring to FIG. 2, the bidirectional WDM-PON comprises a CO, an RN, a plurality of ONUs, a backbone optical fiber (composed of a pair of operational and protective backbone optical fibers) which connects the CO to the RN, and a plurality of distribution optical fibers (of which each is composed of a pair of operational and protective distribution optical fibers) which connect the respective ONUs to the RN.

In the WDM-PON, the CO and the RN use an AWG which may perform both wavelength-division multiplexing and demultiplexing to perform bidirectional communication through one optical fiber. In particular, the CO has a 1×N AWG, and the RN has an N×N AWG In this exemplary embodiment, two AWGs have the same free spectrum range (FSR) and may be configured in such a manner that wavelength bands used for upstream and downstream are separated by integer times of the FSR.

The CO includes an L-band broadband light source 230, an optical circulator 233 which delivers the light source to a plurality of optical transceivers 221 and 225 positioned in the CO and receives optical signals, modulated into data signals by the optical transceivers 221 and 225, to deliver to a 2×2 coupler through a WDM coupler, a 1×N AWG 210 which multiplexes a plurality of downstream signals having different wavelength and demultiplexes multiplexed upstream optical signals to send to the respective optical transceivers, a C-band broadband light source 231 which provides seed light of a transmitter of an ONU, an optical isolator 235, and a 2×2 coupler 236 which couples the C-band broadband light source and downstream optical signals to the operational and protective backbone optical fibers 241 and 242.

The L-band broadband light source 230 serves as a seed light source of the optical transmitters 222 of the optical transceivers 221 and 225 of the CO such that the optical transmitters 222 may perform a colorless, regardless of wavelength, operation. Further, the C-band broadband light source 231 serves as a seed light source of the optical transmitters 276 and 286 of the ONUs 270 and 280 such that the optical transmitters 276 and 286 may perform a colorless operation.

The AWG 210 has a plurality of ports which transmit optical signals having a preset different wavelength band from each other. At this time, in order for such a colorless operation in which an arbitrary optical transmitter may communicate with the AWG 210 regardless of which port the optical transmitter is connected to, the wavelength of optical signals received and transmitted by the optical transmitter 222 should be determined depending on the port of the AWG 210 connected to the corresponding optical transmitter 222.

Therefore, where the optical transmitter 222 receives incoherent light of the L-band broadband light source 230 which is spectrum-sliced by the AWG 210, the received light serves as seed light such that the wavelength of output light amplified from the optical transmitter 222 becomes identical to that of the seed light. For such an operation, the transmitter 222 according to this exemplary embodiment may be a Fabry-Perot laser, of which the entire surface is subjected to antireflection coating, or a reflective semiconductor optical amplifier (RSOA).

Further, the C-band broadband light source 231 serves as a seed light source of the optical transmitters 276 and 278 of the ONUs 270 and 280 such that the optical transmitters 276 and 278 transmit an optical signal with the same wavelength as that of the seed light. The transmitters 276 and 278 according to this exemplary embodiment may be composed of a Fabry-Perot laser, of which the entire surface is subjected to antireflection coating, or an RSOA.

The RN is composed of an N×N AWG 250, and the transmission characteristic of the N×N AWG 250 is the same as that of the 1×N AWG of the CO. Further, an N-th port of the N×N AWG 250 is connected to the operational backbone optical fiber 241, and an N*-th port of the N×N AWG 250 positioned in the opposite side is connected to the protective backbone optical fiber 242. The other 2(N−1) ports are connected to the respective ONUs, corresponding to the port numbers of the ports, through the operational and protective distribution optical fibers. That is, as shown in FIG. 2, an m-th ONU is connected to an m*-th port of the N×N AWG 250 through the operational distribution optical fiber and is connected to an m-th port of the N×N AWG 250 through the protective distribution optical fiber.

Each of the ONUs includes a tap coupler 271 or 281 which extracts some of downstream signals, a monitor 272 or 282 which detects the extraction, a control unit 273 or 283 which receives a monitor signal to control a switching state, a 1×2 optical switching element 274 or 284, a WDM coupler 275 or 285 which separates a downstream optical signal from an incoherent light source for injection, an optical transmitter 276 or 286, and an optical receiver 277 or 287. In a normal state, the respective ONUs are connected to the RN through the operational distribution optical fiber by using the 1×2 optical switching element, and a downstream optical signal is input to the optical receiver through the WDM coupler so as to be converted into an electrical signal. The incoherent light source for injection is input to the optical receiver and is then modulated in accordance with an upstream signal so as to be transmitted upstream along the same path in the inverse direction.

That is, the optical signal with an upstream signal passes through the WDM coupler 275 or 285 and the optical switching element 274 or 284 so as to reach the N×N AWG 250 of the RN through the operational distribution optical fiber 261 or 264. Then, the optical signal is demultiplexed to the N-th port so as to be transmitted to the 2×2 optical coupler 236 of the CO through the operational backbone optical fiber 241. The upstream optical signal transmitted from the 2×2 optical coupler is divided into two signals. Of the two signals, one is blocked by the optical isolator 235, and the other one passes through two consecutive WDM couplers 234 and 232 so as to be demultiplexed again by the 1×N AWG 210 for each wavelength. Then, the demultiplexed signal is delivered to the respective optical transceivers such that the bidirectional communication is performed.

Figure 3:
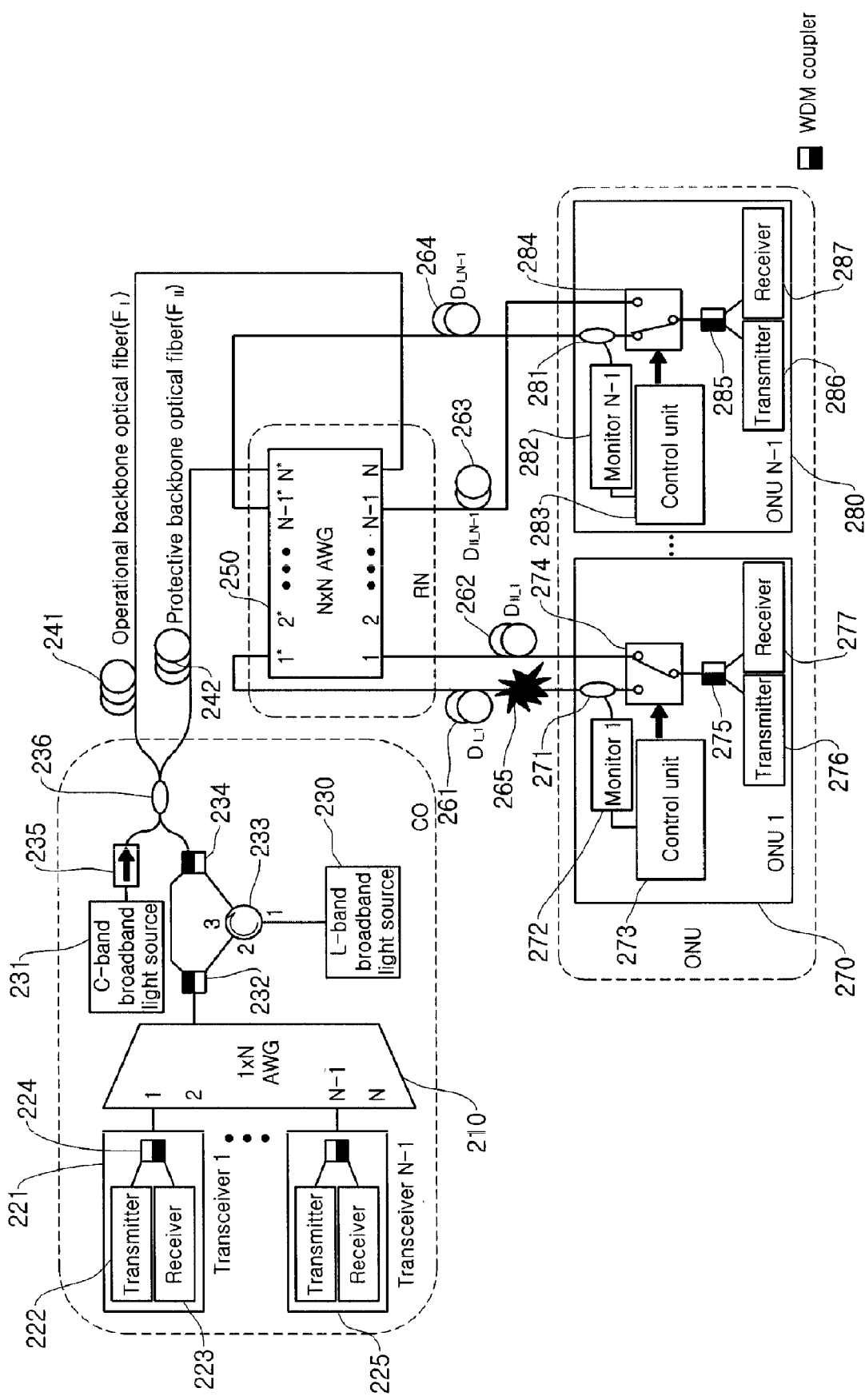
FIG. 3 is a diagram for explaining a communication recovering process where a failure occurs in an operational distribution optical fiber in a WDM-PON according to an exemplary embodiment.

Referring to FIG. 3, an exemplary communication recovering process will be described, which is performed where a failure occurs in an operational distribution optical fiber which connects a first ONU. Where the operational distribution optical fiber 261 is cut off (265), an optical signal input to the monitor 272 disappears. Therefore, the control unit 273 switches the state of the optical switching element 274 into a state shown in FIG. 3 such that a downstream optical signal from the RN is received through the protective distribution optical fiber 262 and an upstream optical signal is transmitted upstream through the protective distribution optical fiber 262. Then, the CO and the first ONU transmit optical signals through the protective backbone optical fiber 242 and the protective distribution optical fiber 262. At this time, where no failure occurs in the operational distribution optical fiber 264 which connects another ONU 280, the ONU and the CO transmit optical signals through the operational backbone optical fiber 241 and the operational distribution optical fiber 264.

Figure 4:
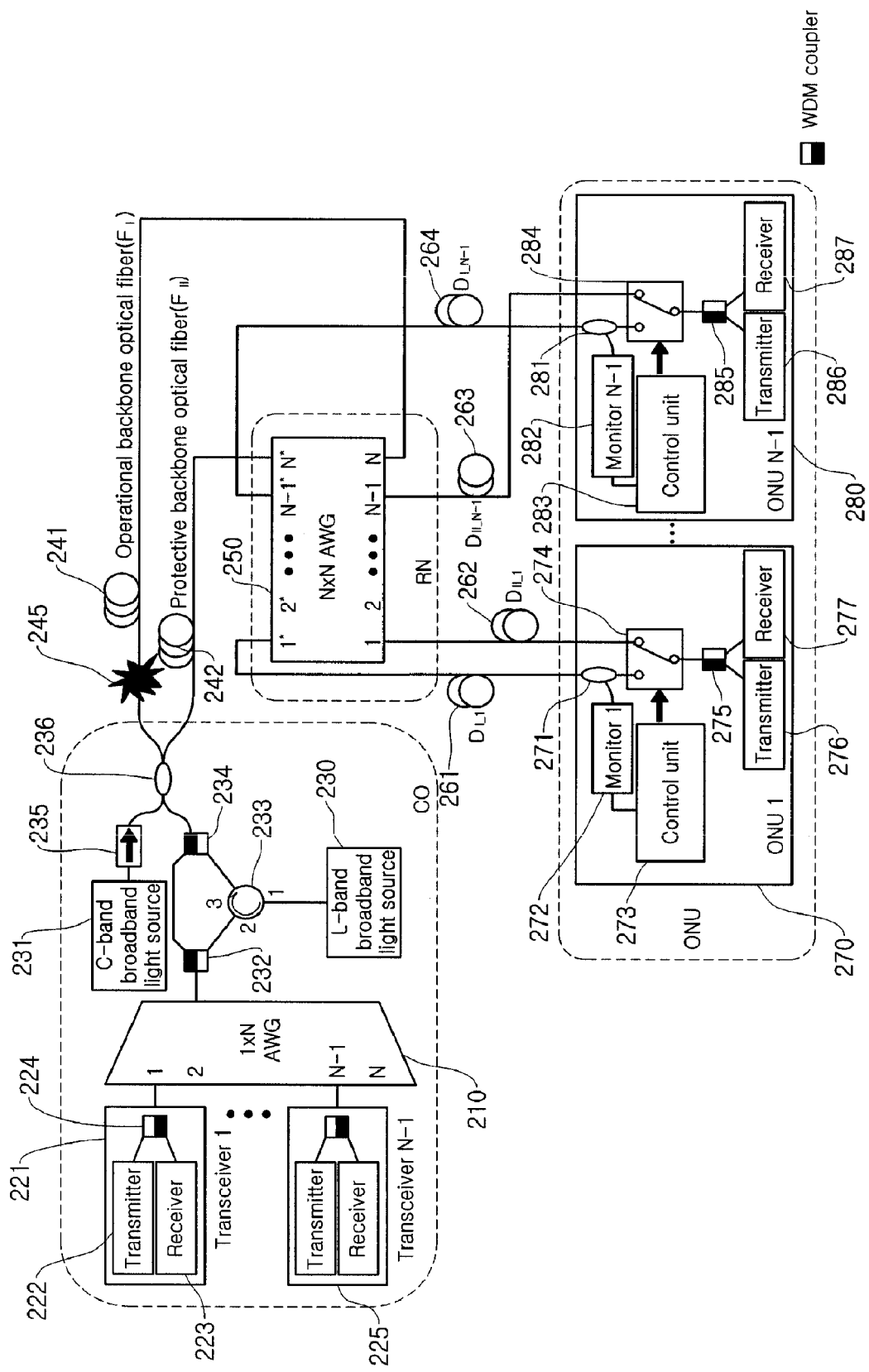
FIG. 4 is a diagram for explaining a communication recovering process where a failure occurs in an operational backbone optical fiber in a WDM-PON according to an exemplary embodiment.

FIG. 4 is a schematic view for explaining an exemplary communication recovering process where a failure occurs in a backbone network in a WDM-PON which may survive in case a failure occurs in the backbone network or distribution network.

As shown in FIG. 4, where a failure occurs in the operational backbone optical fiber 241 (245), a downstream optical signal input to the N-th port of the N×N AWG of the RN disappears. Therefore, since optical signals output from the 1*st to (N−1)*-th ports disappear, the downstream optical signal monitors 272 and 282 provided in all the ONUs detect the disappearance of the optical signals, and the control units 273 and 283 convert the state of the optical switching elements 274 and 284 into a state shown in FIG. 4 such that the ONUs are connected to the RN through the protective distribution optical fibers 262 and 263. At this time, the downstream optical signal transmitted through the protective backbone optical fiber is transmitted to the N*-th port of the N−N AWG of the RN so as to be demultiplexed to the 1st to (N−1)-th ports. Then, the demultiplexed signals are input to the receivers of the ONUs through the respective protective distribution optical fibers. Inversely, the respective upstream optical signals are transmitted to the 1st to (N−1)-th ports of the N×N AWG of the RN through the protective distribution optical fibers and are multiplexed to the N*-th port. Then, the multiplexed signals are transmitted upstream through the protective backbone optical fiber.

In the WDM-PON according to an exemplary embodiment, since two of the N-th and N*-th ports of the N×N AWG positioned in the RN are used as multiplexing ports, the maximum number of ONUs is N−1.

As described above, where a failure occurs in the backbone optical fiber and the distribution optical fiber, the bidirectional WDN-PON according to an exemplary embodiment spontaneously detects the failure and recovers the network. Particularly, since a colorless ONU may be used, the cost of installation and maintenance may be reduced.

Figure 5:
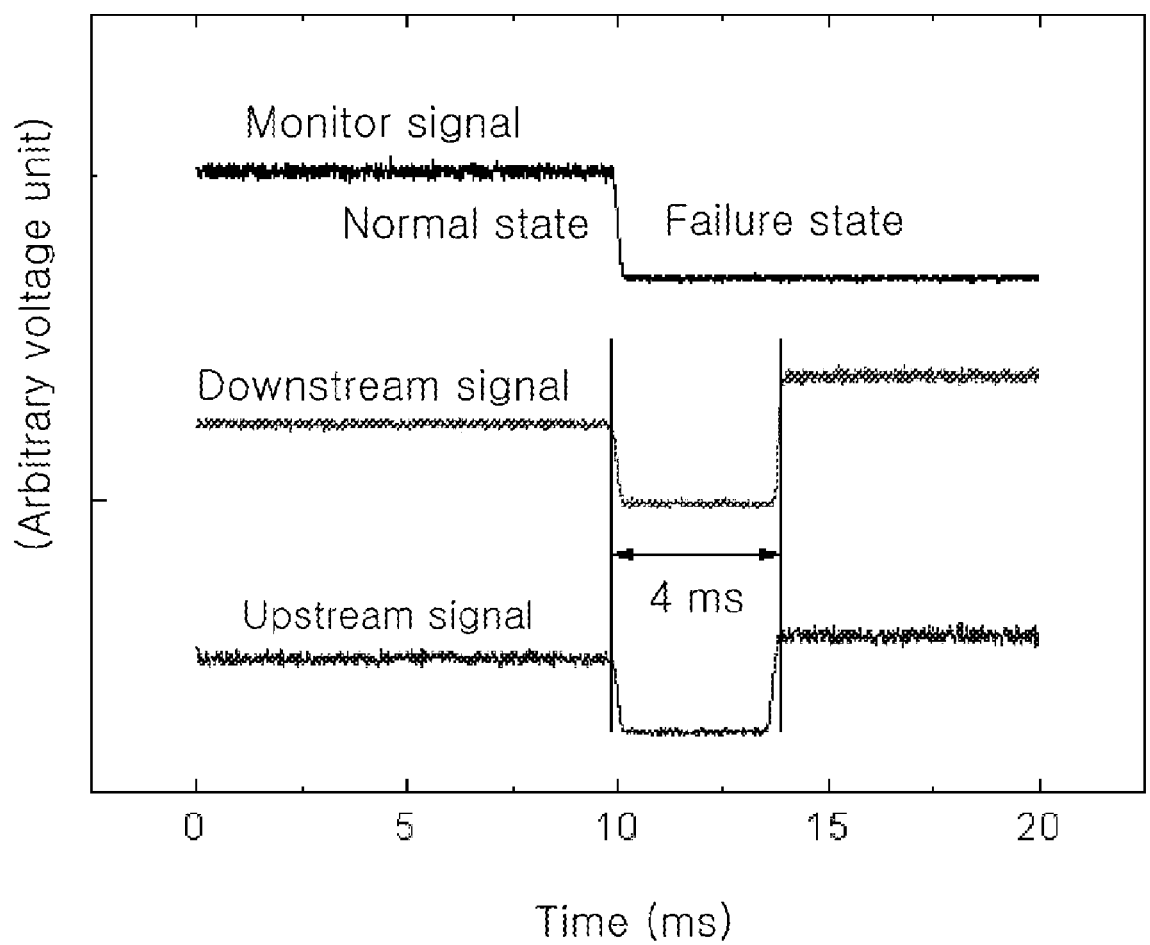
FIG. 5 is a graph showing an experiment result obtained by measuring a time required for recovering communication in a WDN-PON according to an exemplary embodiment.

FIG. 5 is a graph showing an experiment result obtained by measuring the time required for recovering communication in a WDN-PON according to an exemplary embodiment. As shown, the communication may be recovered within about 4 ms. In case an optical switching element with a quicker reaction time is used, the recovering time may be further reduced.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bidirectional wavelength division multiplexed passive optical network (WDM-PON) comprising:
    a central office (CO) that transmits and receives multiplexed optical signals;
    a remote node (RN) that communicates with the CO, receives a multiplexed optical signal to demultiplex, and receives a demultiplexed optical signal to multiplex;
    an optical network unit (ONU) that transmits and receives demultiplexed optical signals to and from the RN;
    operational and protective backbone optical fibers that connect the CO to the RN; and
    operational and protective distribution optical fibers that connect the RN to the ONU,
    wherein the ONU transmits and receives optical signals through the operational distribution optical fiber and the operational backbone optical fiber, and when a failure occurs in the operational distribution optical fiber or the operational backbone optical fiber, the ONU transmits and receives optical signals through the protective distribution optical fiber and the protective backbone optical fiber, and
    wherein the CO comprises:
    a first optical transceiver that transmits and receives optical signals;
    a 1×N arrayed waveguide grating (AWG) that wavelength-division multiplexes the optical signal transmitted from the first optical transceiver and wavelength-division demultiplexes the optical signal received into the first optical transceiver;
    a first broadband light source that provides a seed light for generating an optical signal to the ONU;
    a 2×2 optical coupler having ports at one end of the 2×2 optical coupler optically connected to a second WDM coupler and the first broadband light source, respectively, and having ports at the other end of the 2×2 optical coupler optically connected to the operational and protective backbone optical fibers, respectively;
    an optical isolator optically connected between the first broadband light source and the 2×2 optical coupler;
    a first WDM coupler and the second WDM coupler optically connected to each other, the first WDM coupler optically connected between the 1×N AWG and the second WDM coupler;
    an optical circulator optically connected between the first WDM coupler and the second WDM coupler; and
    a second broadband light source that is optically connected to the optical circulator and provides a seed light for generating an optical signal to the first optical transceiver, and
    wherein N represents a natural number.

2. The bidirectional WDM-PON according to claim 1, wherein the first optical transceiver receives the seed light from the second broadband light source and transmits an optical signal having the same wavelength as that of the seed light.

3. The bidirectional WDM-PON according to claim 2, wherein the first optical transceiver is a Fabry-Perot laser, of which the entire surface is subjected to antireflection coating, or a reflective semiconductor optical amplifier (RSOA).

4. The bidirectional WDM-PON according to claim 1, wherein the RN comprises an N×N AWG where N represents a natural number.

5. The bidirectional WDM-PON according to claim 4, wherein when the multiplexed optical signal is input to an N-th port of the N×N AWG, demultiplexed optical signals are output from first to (N−1)th ports of the N×N AWG in the side opposite to the N-th port.

6. The bidirectional WDM-PON according to claim 1, wherein the ONU receives seed light for generating an optical signal from the CO via the RN, and transmits an optical signal having the same wavelength as that of the received seed light.

7. The bidirectional WDM-PON according to claim 1, wherein the ONU comprises:
    an optical signal monitor that measures the intensity of an optical signal received from the RN through the operational distribution optical fiber;
    an optical switching element that is selectively connected to the operational distribution optical fiber or the protective distribution optical fiber;
    a second optical transceiver that is connected to the optical switching element so as to transmit and receive optical signals; and
    a control unit that connects the optical switching element to the protective distribution optical fiber when a failure occurs in the optical signal measured by the optical signal monitor.

8. The bidirectional WDM-PON according to claim 7, wherein the second optical transceiver receives seed light for generating an optical signal from the CO via the RN, and transmits an optical signal having the same wavelength as that of the received seed light.

9. The bidirectional WDM-PON according to claim 8, wherein the second optical transceiver is a Fabry-Perot laser, of which the entire surface is subjected to antireflection coating, or an RSOA.

* * * * *